Figure 1:
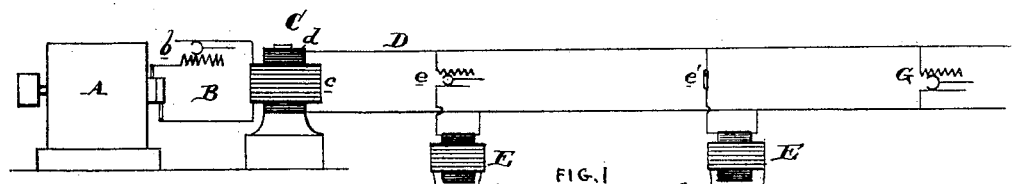

(No Model.)

R. M. HUNTER.
ELECTRICAL TRANSMISSION OF ENERGY.

No. 596,002. Patented Dec. 21, 1897.

Attest:—
Henry D. [illegible]
S. J. Yerkes.

Inventor:
[signature]

UNITED STATES PATENT OFFICE.

RUDOLPH M. HUNTER, OF PHILADELPHIA, PENNSYLVANIA, ASSIGNOR TO THE GENERAL ELECTRIC COMPANY, OF NEW YORK.

ELECTRICAL TRANSMISSION OF ENERGY.

SPECIFICATION forming part of Letters Patent No. 596,002, dated December 21, 1897.

Original application filed November 9, 1887, Serial No. 254,672. Divided and this application filed July 28, 1891. Serial No. 400,973. (No model.)

*To all whom it may concern:*

Be it known that I, RUDOLPH M. HUNTER, of the city and county of Philadelphia and State of Pennsylvania, have invented an Improvement in Electrical Transmission of Energy, of which the following is a specification.

My invention has reference to the electrical transmission of energy; and it consists of certain improvements, which are fully set forth in the following specification and are shown in the accompanying drawings, which form part thereof.

This application (Case No. 202) is a division of my application, Serial No. 254,672, filed November 9, 1887.

The object of my invention is to provide suitable apparatus whereby the conversion of currents by means of induction may be accomplished in a more satisfactory manner from a practical standpoint, and particularly in those cases where very high tension alternating currents are necessary in one or more circuits.

In carrying out my invention I employ a generator (of whatever character it may be) wound for comparatively low intensity compared with the intensity of the currents used at the distant station and convert such low-potential currents into currents of high potential by means of one or more induction-coils or secondary generators. The high-potential currents so generated may be far higher than it would be safe to attempt to make them by the employment of an alternating-current dynamo, and by so increasing their potential I am enabled to reduce to a greater degree the size of the line-wire and strength of its supports to convey a given amount of electrical energy to a distant point. This is particularly advantageous where we employ secondary generating-stations over a large district and where one pair of feeders are to supply current to a number of tertiary converters. The winding of the generators or induction-coils is an extremely small undertaking as compared to the winding of the dynamo-machine, and hence if from any cause the insulation of the wire coils was destroyed the expense of repairing would be but a trifle compared with the same amount of destruction in the dynamo-machine.

In place of using alternating-current machines I may use continuous-current machines with provision for reversing or interrupting the current before it passes through the secondary generators. If desired, the high-tension current generated by the secondary generators may be converted one or more times subsequently by the use of additional converters or induction-coils and produce currents of any degree of tension. These currents may be far higher in potential than that of the primary source. Furthermore, the frequency of the alternations of the current may be increased greatly over what is possible with the alternating-current machine by the employment of a continuous-current machine and a current-reverser in the primary circuit, relying upon the first induction-coil or secondary generator to produce the first increase in the alternating current. In the case of the use of the interrupter the induction-coils change the alternately increasing and decreasing current into an alternating current of uniform tension and frequency.

I do not limit myself to any particular details, as there are many equivalent constructions.

For illustrating several ways of bringing my invention into practice I have shown several drawings, which I will now describe.

Figure 2:
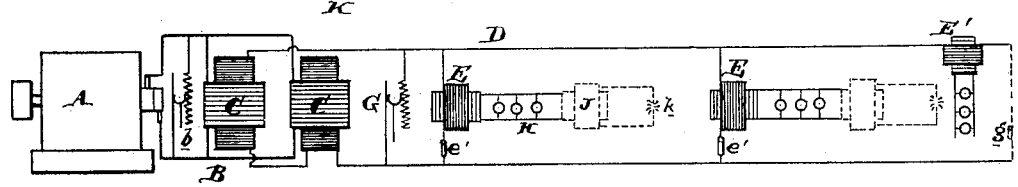
Figure 3:
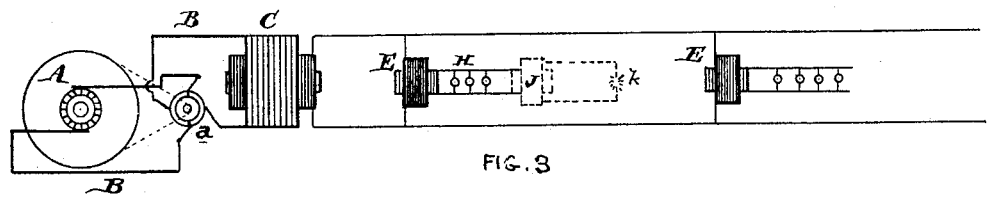
Figure 4:
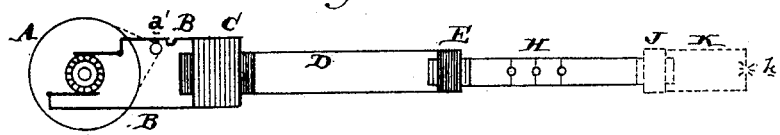

In the drawings, Figure 1 is a diagram of one form of my invention in which I have a single secondary generator in series with the primary generator and line and with the tertiary generators in multiple connection and adapted to supply current for a further conversion to deliver high-potential current to the current consuming or translating device. Fig. 2 is a diagram illustrating a modification of my invention in which two secondary generators are in multiple with the primary generator. Fig. 3 is a diagram substantially similar to Fig. 1, with the exception that the primary generator is a continuous-current machine with a circuit-reverser; and Fig. 4 is substantially the same with a circuit-interrupter in place of the current-reverser.

A is the primary generator and is wound for comparatively low potential and may be either an alternating-current machine or a continuous-current machine.

B is a local circuit and may have a resistance changer or regulator $b$ of any suitable construction, and includes the coarse wire $c$ of a powerful induction-coil or secondary generator C, the fine wire $d$ of which coil is in circuit with the high-resistance line D, which may, if desired, be provided with a short-circuiting resistance-changer G, forming a shunt connection between the outgoing and return wires of the line.

E are the local or tertiary generators and are simple forms of induction-coils having their fine-wire coils connected to the line D in multiple, and the current passing over said fine-wire coils may be regulated by a resistance-changer $e$ or be cut out by a switch $e'$.

H are local circuits at various places along the line and include the coarse wire of the said tertiary generators E. I are lamps, motors, or other translating devices which may be in such local circuits H, and $h$ are current-regulators for said local circuits.

The fourth generator J is connected with the local circuit, so that its coarse wire is included in the local circuit and the fine wire or high-resistance coil connected to a circuit K, including one or more high-tension arc-lamps or other high-tension-translating or current-consuming devices or objects to be energized at a higher tension. This would enable both forms of current to be used at one place or building. By these means I can produce from a primary generator capable of generating but low potential, currents of great frequency and exceedingly high potential, which high-potential currents may be directly employed for producing light or for other purposes.

In Fig. 2 in place of a single secondary generator C I have two sets of generators having their coarse wire coupled in multiple with the primary generator and the fine wire coupled in series with the line D to increase the tension of the current. In this case two of the tertiary generators are shown as arranged in multiple connection with the line, and one (marked E') is shown as in series with the line. When this latter is not used, the switch $g$ may be opened.

The currents generated by any one of the induction-coils E or E' may be again converted by the use of generator J, as in the case of Fig. 1, producing the higher-tension currents in local circuits containing a translating or current-consuming device adapted to such high-tension currents.

In the construction shown in Fig. 3 we have a continuous-current generator and a current-reverser $a$ in the local circuit B to convert the continuous current into an alternating current before it passes through the secondary generator. Otherwise this figure shows substantially the same system as Fig. 1. With this construction I can employ any degree of frequency of the alternations desired. The current-reverser can be formed of as many segments as desired in any of the well-known manners and can be rotated at any desired speed to give the necessary frequency, while the employment of the converters will give the necessary tension. The construction shown in Fig. 3 may be employed in connection with the circuits and converters shown in Figs. 1 and 2.

In the case of Fig. 4 I have a current-interrupter $a'$ located in the place of the current-reverser of Fig. 3.

These various systems are simply different methods for putting the same general invention into practice, and hence in the broad sense I consider them equivalents.

It is evident that the source of alternating currents may be greatly removed from the place of consumption or utilization, and the high-tension currents employed in the line may be of such tension as to reduce the size of the wire and supports to a sufficient degree for economy. This current at the local station, which includes the converters E and J and circuits H and K of Fig. 1, is converted by induction into any desired degree of tension for the particular use to which it is applied. By the induction-coil E it may be reduced in tension and by the induction-coil J it may be increased to enormously high tension, if desired.

It is also evident that while this invention is especially adapted to the employment of high-tension currents in the line it is not so limited.

What I claim as new, and desire to secure by Letters Patent, is—

1. The combination of means for generating currents of electricity, of high tension, a line-circuit leading therefrom to a distant place, induction apparatus for reducing potential of said line-currents, a local circuit supplied with the low-tension induced currents from said induction apparatus, translating or current-consuming devices arranged in the local circuit, an induction-coil having its coarse wire connected with the local circuit and in parallel with the translating or current-consuming devices, and a high-tension circuit connected with the fine wire of the induction-coil and supplying current to a second local circuit insulated from the other.

2. The combination of a generator for currents of electricity of alternating increasing and decreasing potential, a short local circuit therefor, a transformer or induction-coil having its coarse wire connected with the short local circuit and its fine wire connected with the line, a line-circuit connected with said fine wire of the transformer or induction-coil and leading to a distant place, induction apparatus for reducing potential of said line-currents, a local circuit supplied with the low-tension induced currents from said induction apparatus, translating or current-consuming devices arranged in the local circuit, an induction-coil having its coarse wire connected with the local circuit and in parallel with the translating or current-consuming devices, and a high-tension circuit connected with the fine wire of the induction-coil and supplying current to a second local circuit insulated from the other.

In testimony of which invention I have hereunto set my hand.

R. M. HUNTER.

Witnesses:
ERNEST HOWARD HUNTER,
S. T. YERKES.